(12) United States Patent
Yamashita

(10) Patent No.: US 8,543,993 B2
(45) Date of Patent: Sep. 24, 2013

(54) COMPILER, COMPILE METHOD, AND PROCESSOR CORE CONTROL METHOD AND PROCESSOR

(75) Inventor: Koichiro Yamashita, Kawasaki (JP)

(73) Assignee: Fujitsu Limited, Kanagawa (JP)

( * ) Notice: Subject to any disclaimer, the term of this patent is extended or adjusted under 35 U.S.C. 154(b) by 686 days.

(21) Appl. No.: 12/726,526

(22) Filed: Mar. 18, 2010

(65) Prior Publication Data
US 2010/0235611 A1    Sep. 16, 2010

Related U.S. Application Data

(63) Continuation of application No. PCT/JP2007/001028, filed on Sep. 21, 2007.

(51) Int. Cl.
*G06F 9/45* (2006.01)

(52) U.S. Cl.
USPC ............................ 717/150; 717/153; 717/160

(58) Field of Classification Search
None
See application file for complete search history.

(56) References Cited

U.S. PATENT DOCUMENTS

| | | | | |
|---|---|---|---|---|
| 6,367,071 B1* | 4/2002 | Cao et al. | ...................... | 717/160 |
| 7,140,010 B2* | 11/2006 | Tirumalai et al. | ............. | 717/153 |
| 7,487,497 B2* | 2/2009 | Ren et al. | ....................... | 717/150 |
| 7,493,604 B2* | 2/2009 | Mariani | ........................ | 717/153 |
| 7,555,745 B2* | 6/2009 | Iwashita | ....................... | 717/150 |
| 7,739,530 B2* | 6/2010 | Takayama et al. | ............ | 717/150 |
| 7,895,453 B2* | 2/2011 | Kasahara et al. | ............. | 713/300 |
| 7,904,893 B2* | 3/2011 | Munter et al. | ................ | 717/148 |
| 7,962,906 B2* | 6/2011 | O'Brien et al. | ............... | 717/160 |
| 8,028,281 B2* | 9/2011 | Bera | .............................. | 717/153 |
| 8,375,375 B2* | 2/2013 | Ren et al. | ....................... | 717/150 |
| 8,402,447 B2* | 3/2013 | Duffy et al. | ................... | 717/150 |
| 2004/0215987 A1 | 10/2004 | Farkas et al. | | |
| 2005/0229149 A1* | 10/2005 | Munter et al. | ................ | 717/100 |
| 2007/0255929 A1 | 11/2007 | Kasahara et al. | | |
| 2007/0256065 A1* | 11/2007 | Heishi et al. | .................. | 717/151 |
| 2007/0283358 A1* | 12/2007 | Kasahara et al. | ............. | 718/104 |
| 2008/0127146 A1* | 5/2008 | Liao et al. | ..................... | 717/150 |

(Continued)

FOREIGN PATENT DOCUMENTS

| | | |
|---|---|---|
| JP | 02-132526 A | 5/1990 |
| JP | 2006-344162 A | 12/2006 |
| WO | WO 2006/109887 A1 | 10/2006 |

OTHER PUBLICATIONS de Abreu Silva et al., "Power Performance Optimization in FPGA-Based Asymmetric Multi-Core Systems", 2012 IEEE, pp. 473-474; <http://ieeexplore.ieee.org/stamp/stamp.jsp?tp=&arnumber=6339197>.*

(Continued)

*Primary Examiner* — Thuy Dao
*Assistant Examiner* — Ben C Wang
(74) *Attorney, Agent, or Firm* — Arent Fox LLP

(57) ABSTRACT

A compiler compiling a source code and is implemented in a plurality of processor cores includes a parallel loop processing detection unit configured to detect from the source code a loop processing code for execution of an internal processing operation for a given number of repeating times, and an independent parallel loop processing code in the internal processing operation performed for each repetition to be concurrently processed, and a dynamic parallel conversion unit configured to generate a control core code for control of the number of repeating times in the parallel loop processing code and a parallel processing code for changing the number of repeating times corresponding to the control from the control core code.

23 Claims, 11 Drawing Sheets

(56) References Cited

U.S. PATENT DOCUMENTS

| | | | |
|---|---|---|---|
| 2008/0229298 A1* | 9/2008 | O'Brien et al. | 717/160 |
| 2010/0146310 A1* | 6/2010 | Kasahara et al. | 713/300 |
| 2011/0088022 A1* | 4/2011 | Kruglick | 717/153 |
| 2012/0079466 A1* | 3/2012 | Gonion | 717/150 |
| 2012/0192167 A1* | 7/2012 | Eichenberger et al. | 717/150 |

OTHER PUBLICATIONS

Tsoi et al., "Power profiling and optimization for heterogeneous multi-core systems", ACM SIGARCH Computer Architecture News, vol. 39, No. 4, Sep. 2011, pp. 8-13; <http://dl.acm.org/citation.cfm?id=2082159>.*

Wada et al., "A Parallelizing Compiler Cooperative Heterogeneous Multicore Processor Architecture", Springer-Verlag Berlin Heidelberg 2011, HiPEAC IV, LNCS 6760, pp. 215-233; <http://link.springer.com/content/pdf/10.1007%2F978-3-642-24568-8_11.pdf>.*

Steven A. Lieberman et al., "Extracting Statistical Loop-Level Parallelism using Hardware-Assisted Recovery", Technical Report of the Computer Science and Engineering Department No. CSE-TR-528-07, Feb. 1, 2007, pp. 1-12.

Kelvin K. Yue et al., "Implementing a Dynamic Processor Allocation Policy for Multiprogrammed Parallel Applications in the Solaris™ Operating System", Concurrency and Computation: Practice and Experience, May 1, 2001, vol. 13, No. 6, pp. 449-464.

Chao-Tung Yang et al., "A Portable Parallelizing Compiler with Loop Partitioning", Proceedings of the National Science Council, Nov. 1999, vol. 23, No. 6, pp. 751-765.

Taichi Yuasa et al., "Hajimete no parallel programming", BIT, Jun. 10, 1998, pp. 132-134, Kyoritsu Shuppan, Co., Ltd.

* cited by examiner

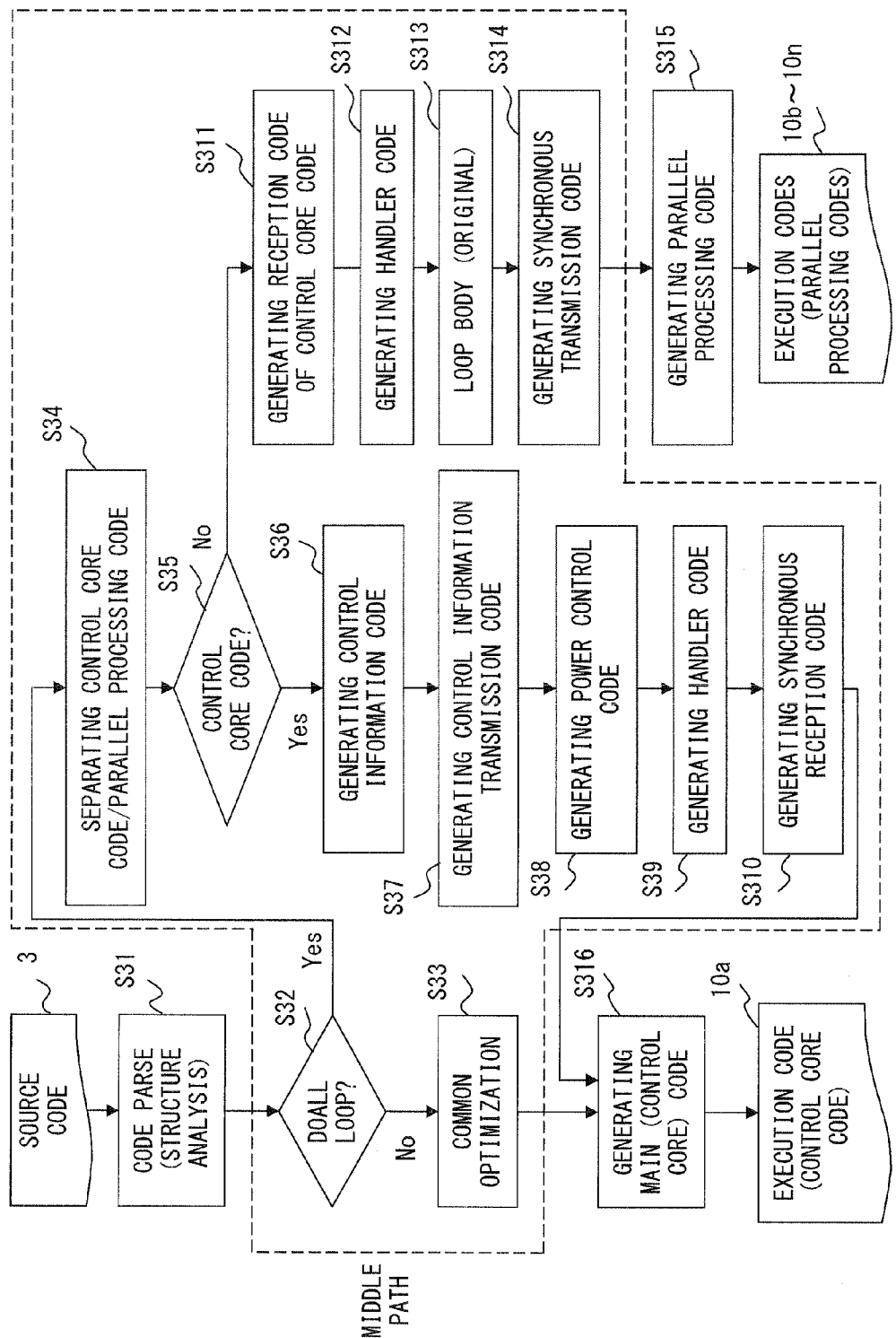

ORIGINAL CODE

CODE AFTER CONVERSION

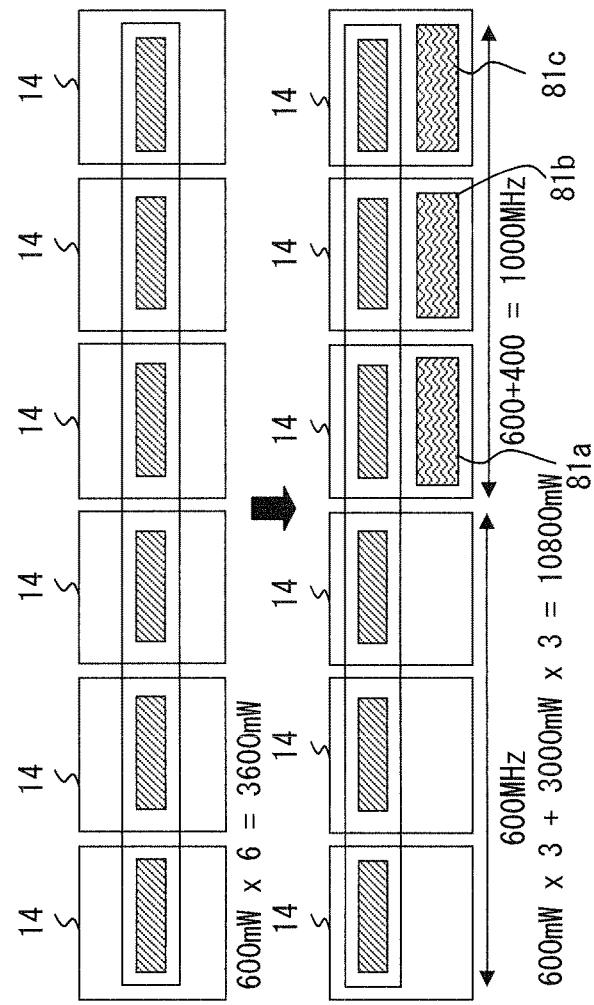

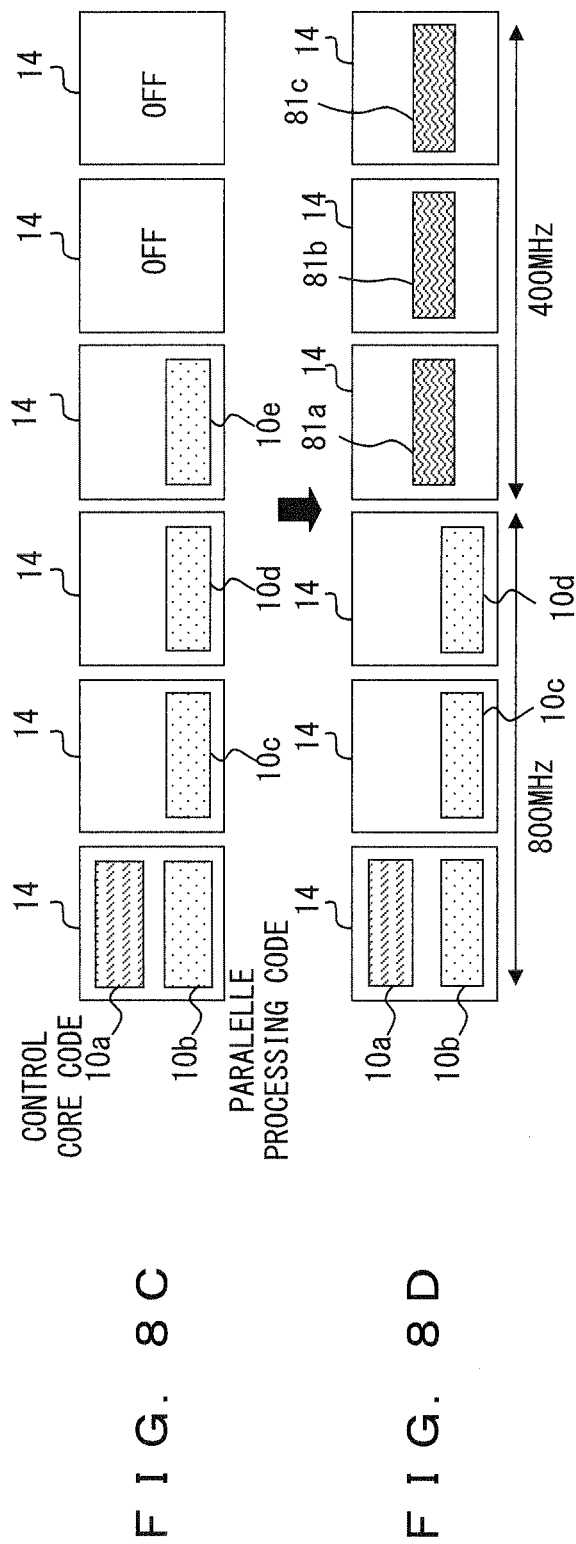

F I G. 8 E
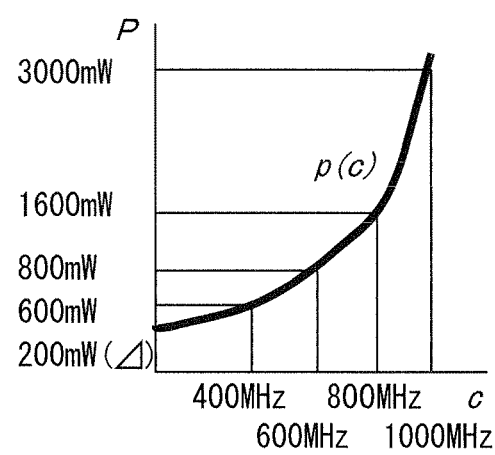

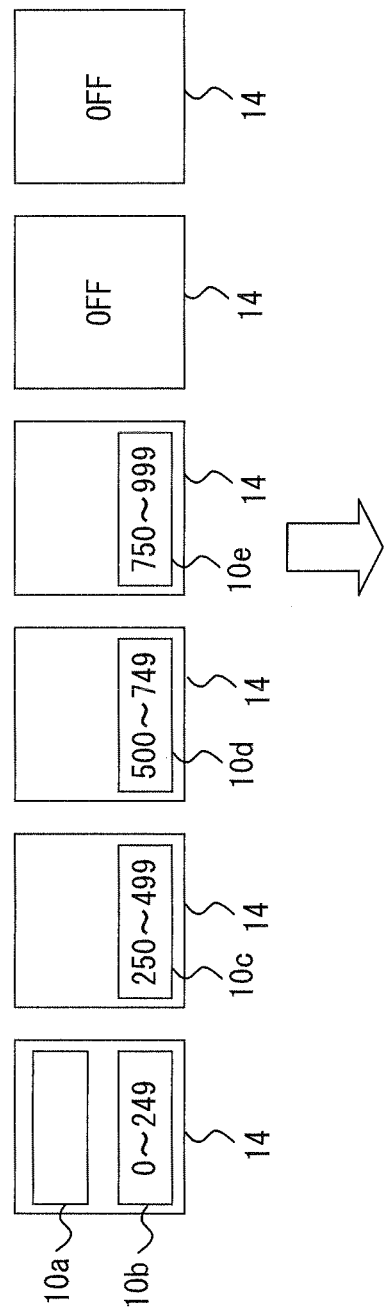
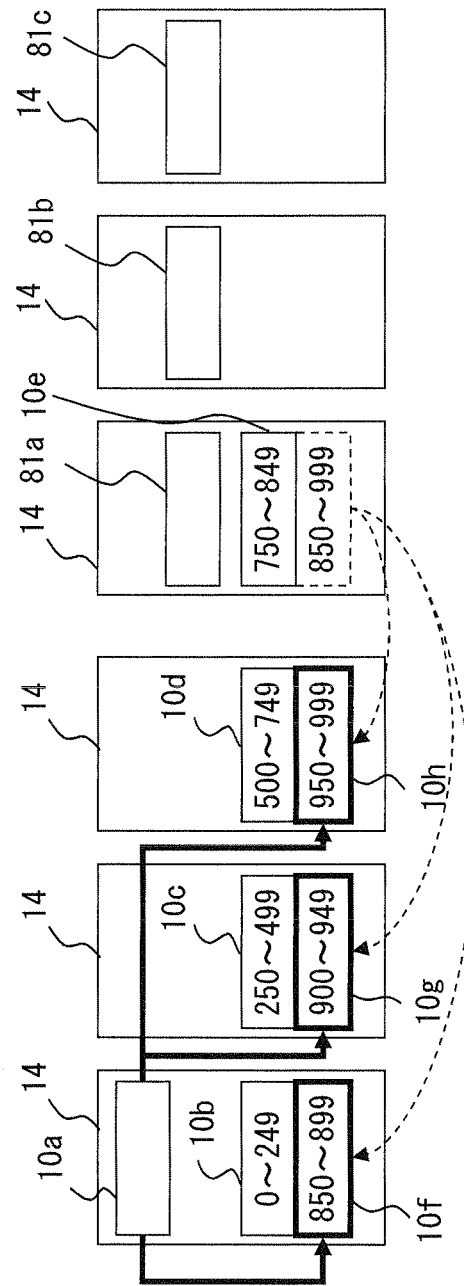

COMPILER, COMPILE METHOD, AND PROCESSOR CORE CONTROL METHOD AND PROCESSOR

CROSS-REFERENCE TO RELATED APPLICATIONS

This application is a continuation application of International PCT Application No. PCT/JP2007/001028 which was filed on Sep. 21, 2007.

FIELD

The embodiments discussed herein relate to a compiler, a compile method, a processor core control method and a processor.

BACKGROUND

Conventionally, in a self-contained system, requested functions are more complicated while a processor is implemented for general purpose use, and a method for realizing the functions by software processing is proposed.

However, the requested functions are complicated in recent years, the computational complexity of software by a processor increases, and the power consumption of the processor also increases. On the other hand, it is important to reduce power consumption with smaller self-contained equipment, and solve a problem of a heat caused thereby.

Thus, methods for performing parallel processing have been proposed using a plurality of processors and a multicore processor chip. For example, a portion for dividing a program into function blocks for executing distributed functions, and parallel processing for expanding a loop process of a program in parallel and distributing loads are well known.

Assume that a processor of a system configured by a plurality of processors is referred to as a processor core, and each processor of a multicore processor chip is also referred to as a processor core.

Generally, when implementation is realized on a processor core, the number of parallel expansions of loop execution is statically divided by using all processor cores for the given number of processor cores.

In addition, it is known that the entire power consumption of a system implemented with a program having loop parallelism or a multicore processor chip can be reduced more effectively by performing loop division on the program having the loop parallelism and operating each processor core at a low frequency than by performing the operation at a high frequency using a single processor.

The phenomenon arises by the physical and electric characteristics of a processor core, and when the frequency is raised, the power consumption rises acceleratingly, but not proportionally.

However, the above-mentioned tendency refers to the characteristics of hardware, but does not refer to the optimum tendency when an application is performed by actual consumer products.

In the conventional compiler technology, the number of processor cores in the target execution environment is statically provided during compilation, and the code of each processor core generated by a compiler is fixedly allocated to an executing processor core.

In addition, a method for reducing power consumption can be a technique of dividing a power supply to each domain, locally stopping power supply, and changing a clock setting to each processor core.

However, the conventional technology is a result of implementing the electric superiority with a plurality of processors relative to a single processor and the efficiency of distributed load by expanding loop parallelism for a plurality of processor cores as separate events. It is not to obtain the optimum solution by totally considering the actual physical characteristic and the efficiency of the parallel execution, or to optically reduce the power consumption.

SUMMARY

A compiler compiling a source code and is implemented in a plurality of processor cores includes a parallel loop processing detection unit configured to detect from the source code a loop processing code for execution of an internal processing operation for a given number of repeating times, and an independent parallel loop processing code in the internal processing operation performed for each repetition to be concurrently processed, and a dynamic parallel conversion unit configured to generate a control core code for control of the number of repeating times in the parallel loop processing code and a parallel processing code for changing the number of repeating times corresponding to the control from the control core code.

It is to be understood that both the foregoing general description and the following detailed description are exemplary and explanatory and are not restrictive of the invention, as claimed.

Additional aspects and/or advantages will be set forth in part in the description which follows and, in part, will be apparent from the description, or may be learned by practice of the invention.

BRIEF DESCRIPTION OF DRAWINGS

FIG. 3 is a process flow of the compiler according to an embodiment;

FIGS. 8A, 8B, 8C, 8D and 8E illustrate the operation performed when a disturbance occurs; and FIGS. 9A and 9B illustrate an operation performed when an iteration division is performed.

DESCRIPTION OF THE EMBODIMENTS

A code for an operation with low power consumption is generated with respect to a self-contained system (multiprocessor environment) operating by software such as a system configured by a plurality of processors, a multicore processor chip.

A processor of a system configured by a plurality of processors is referred to as a processor core, and each processor of a multicore processor chip is also referred to as a processor core.

The present embodiment is applied to a loop processing code for execution of an internal processing operation for a predetermined number of repeating times, and a parallel loop processing code that may be processed in parallel and independent of each other in the internal processing operation executed for each iteration.

The parallel loop processing code allows the multiprocessor environment with low power consumption by dynamically changing the parallel execution level with the power characteristic of the processor core taken into account depending on the operation state of the software while it is executed by the processor core.

The translation device for compiling a source code implemented in a plurality of processor cores in a multiprocessor environment is provided with a parallel loop processing detection unit and a dynamic parallel conversion unit.

The parallel loop processing detection unit detects a loop processing code for execution of internal processing operation for a predetermined number of repeating times and a parallel loop processing code that may be processed in parallel but independent of each other in the internal processing operation performed in each iteration.

In addition, the parallel loop processing code that may be detected by a parallel loop processing detection unit and may be processed in parallel is a code in a DOALL loop, a DOSUM loop, etc.

In the loop processing in a program, the loop processing in the form of a DOALL loop etc. is frequently described in a general-purpose and practical application or algorithm such as a line unit process in image processing, packet processing in communications, etc. and is generally and explicitly expressed in a DOALL form, and takes a long time of the entire time of program processing.

The dynamic parallel conversion unit generates a parallel processing code obtained by adding a parallel processing control code to a parallel loop processing code to perform control of dynamically changing the number of repeating times, and a control core code for dynamic control of the number of repeating times of the parallel processing code.

The embodiments of the present embodiment are described below with reference to the attached drawings.

Embodiment 1

Configuration

Figure 1:
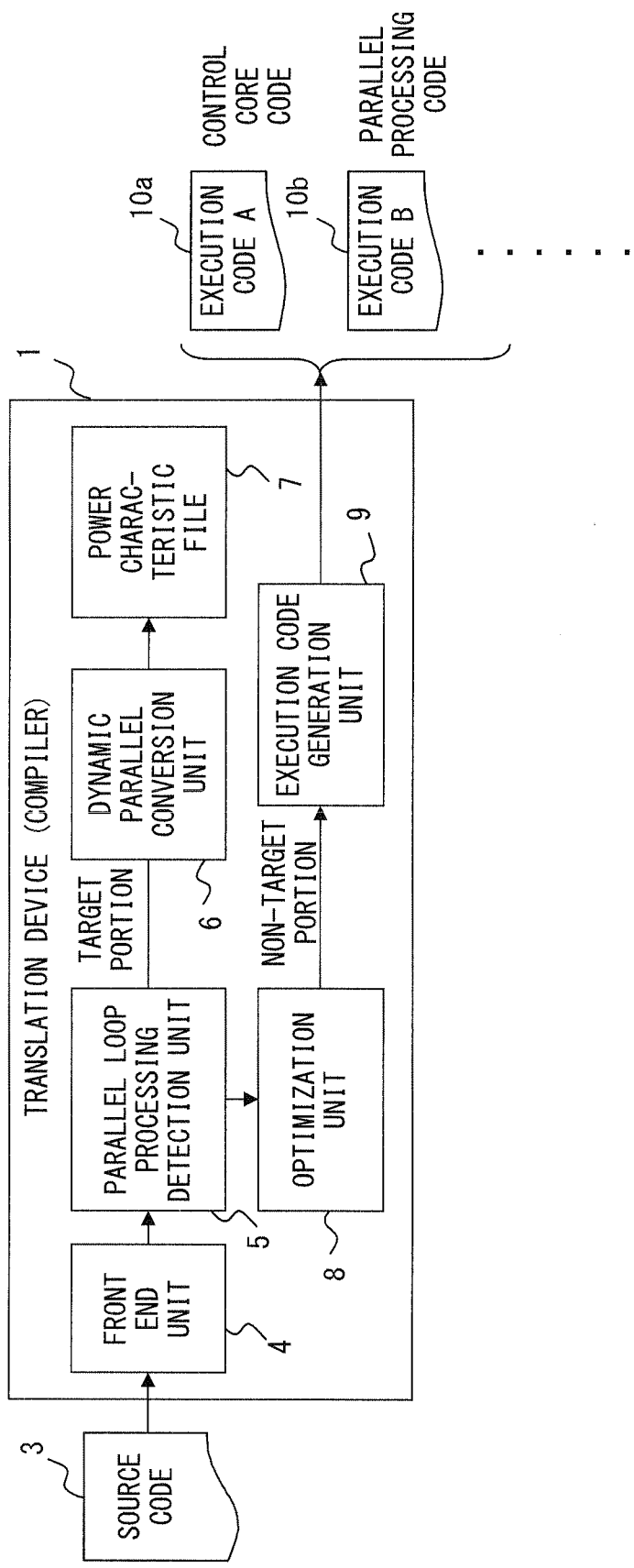
FIG. 1 is a configuration of the translation device and the multicore processor core according to the present invention.

FIG. 1 is a configuration of a translation device 1 (compiler) and a multiprocessor environment. In the present embodiment, a multicore processor chip 2 is used as a multiprocessor environment.

The translation device 1 analyzes the structure of a source code as a source of software to be executed, embeds a code for communications, an interrupt, and information exchange, and generates a code with which the structure is changed. In addition, it sets a re-scheduling method on the basis of the profile of a power characteristic, changes the executable form of the software by scheduling, and generates a code for control of power using a hardware-like power control unit provided for a multicore processor.

The translation device 1 is configured by a front end unit 4, a parallel loop processing detection unit 5, a dynamic parallel conversion unit 6, a power characteristic file 7, an optimization unit 8, and an execution code generation unit 9.

The front end unit 4 executes the code parse (structural analysis) of a source code 3 described in the C language etc. and generates a first intermediate file.

The parallel loop processing detection unit 5 detects a parallel loop processing code such as a DOALL loop from the first intermediate file.

The dynamic parallel conversion unit 6 prepares a parallel loop processing code (first intermediate file) for each of the processor cores 14 for parallel execution on the basis of the power characteristic file 7 described later. A parallel processing control code for control of dynamically changing the number of repeating times to allow each of the parallel loop processing codes to operate in parallel is added and a plurality of parallel processing codes 10b through 10n are generated.

A control core code for dynamic control of the number of repeating times of the parallel processing code assigned to each processor core 14 is also generated. The parallel processing code and the control core code are generated in the second intermediate file in an intermediate language.

The power characteristic file 7 stores the relationship between a clock frequency and power consumption for each processor core 14.

The optimization unit 8 optimizes the codes other than the parallel loop processing codes in the first intermediate file. The optimized first intermediate file is generated in the second intermediate file in the intermediate language.

The execution code generation unit 9 generates an execution code 10 by converting the second intermediate file generated by the dynamic parallel conversion unit 6 and the optimization unit 8 into an execution code.

Next, the multicore processor chip 2 illustrated in FIG. 1 is configured by a power clock control unit 11, an OS 12 (operating system), a power characteristic file 13, and the processor core 14.

The power clock control unit 11 controls the clock, stop, and activation of each processor by hardware effect.

The OS (operating system) 12 controls each processor core 14. In FIG. 1, it is connected only to the processor core 14 loaded with a control core code, but is actually connected to other processor cores 14.

As with the power characteristic file 7, the power characteristic file 13 stores the relationship between the clock frequency and the power consumption.

(Description of Operations)

Figure 2:
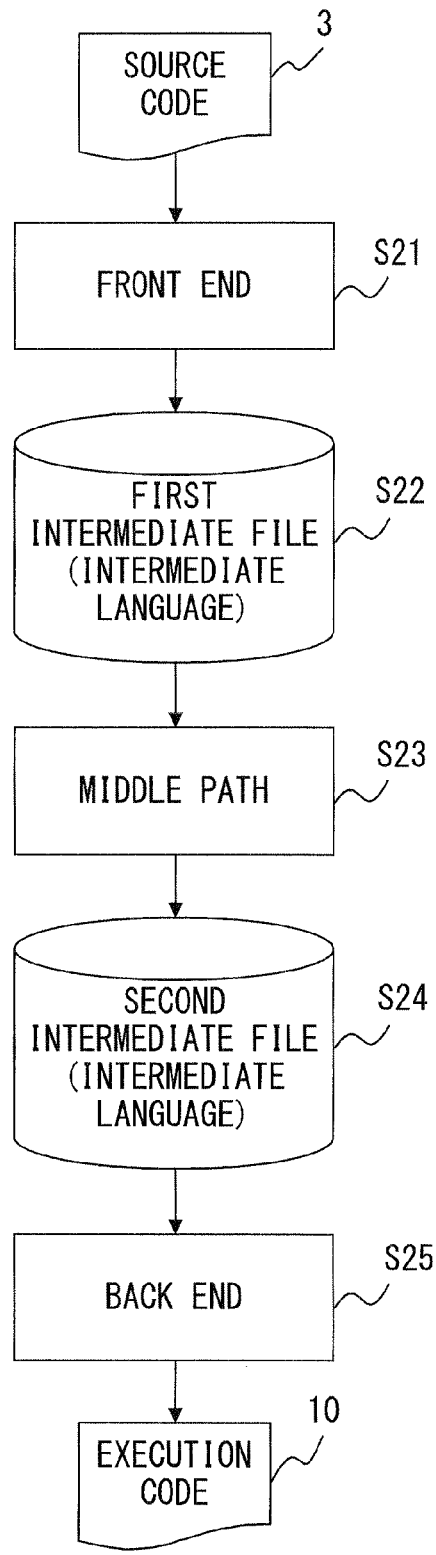
FIG. 2 is a process flow of the compiler according to an embodiment.

FIG. 2 is a flowchart of the procedure of generating a code of the translation device 1.

In step S21 (front end), the source code 3 is acquired, the code parse is executed and a first intermediate file is generated.

In step S22 (first intermediate file), the first intermediate file is stored.

In step S23 (middle path), the first intermediate file is acquired and a parallel loop processing code such as a DOALL loop is detected.

For example, a DOALL loop is detected through the middle path. In the middle path, the structure of a program is analyzed in a given intermediate language, and the optimization is performed on the basis of the acquired data dependence.

The determination of the DOALL loop processing is generally performed on the basis of the following analysis.

When a reference variable group is Use (LBi), and a definition variable group is Def (LBi) with respect to a loop body LBi which configures the main block diagram of the DOALL loop processing and refers to an arithmetic operation actually performed for the loop processing, a target loop may be the DOALL loop by defining it as a block having the loop structure satisfying the equation (1) below where i indicates the i-th iteration of the number of repeating times (number of iteration times).

All iterations of the loop are substituted for m and n.

$$\Sigma m\ n\{\text{Use}(LBm) \cap \text{Def}(LBn)\} = \Phi \quad (1)$$

After detecting the DOALL loop by the equation (1) above, the parallel loop processing code (in the state of the first intermediate file) is prepared for each of the processor cores 14 for parallel execution on the basis of the power characteristic file 7 which stores the relationship between the clock frequency and the power consumption. A parallel processing control code for control of dynamically changing the number of repeating times to allow each of the parallel loop processing codes to operate in parallel is added and a plurality of parallel processing codes 10b through 10n are generated.

A control core code for dynamic control of the number of repeating times of the parallel processing code assigned to each processor core 14 is also generated. The parallel processing code and the control core code are generated in the second intermediate file in an intermediate language.

In the first intermediate file, the codes other than the parallel loop processing code are optimized and a redundant code is deleted. In this example, the optimized first intermediate file is generated in the second intermediate file in the intermediate language.

In step S24 (second intermediate file), the second intermediate file is stored in the memory.

In step S25 (back end), the second intermediate file is converted into the execution code 10.

In FIG. 3, a code analysis and a structure analysis are performed on the basis of a given source code. When it is determined that a target loop is a DOALL loop, a process of changing a structure is performed, and a control core code and a parallel processing code are generated.

FIG. 3 is a flowchart of the detailed procedure of generating a code of a middle path illustrated in FIG. 2.

In step S31, a code parse process is performed as with the front end unit illustrated in FIG. 1 and in step S21 illustrated in FIG. 2.

In step S32, a parallel loop processing code (first intermediate file) such as a DOALL loop is detected from the first intermediate file by being output from a code parse. If it may not be detected, control is passed to step S33. When the parallel loop processing code is detected, control is passed to step S34.

In step S33, the conventional code generation is performed on the portion not related to the DOALL loop processing. The process similar to the process of the optimization unit 8 illustrated in FIG. 1 is performed.

In step S34, the DOALL loop code is divided into a control core code and a parallel processing code.

In step S35, it is determined whether or not the code is a control core code. If it is a control core code, control is passed to step S36. If not, it is a parallel processing code, and control is passed to step S311.

In step S36, at the start of the process, a control core code for calculation of the number of divided loops indicating the number of loops each of which is to perform a divided operation, the number of iteration times of each parallel processing code, and the starting position of the iteration is generated, and added to the control core code. The processing method for calculation is described later.

The control information code is configured by a parallelism selection code and an iteration number analysis code.

The parallelism selection code is used in calculating the number of necessary processor cores for a process of the parallel processing code in the loop processing time on the basis of an operation clock, the operation power consumption corresponding to the frequency of the operation clock, and necessary loop processing time for the process of the parallel loop processing code for each processor core 14 for executing the parallel processing code, and the calculated number of processor cores is defined as a number of divided loops.

The iteration number analysis code is used in calculating the number of iteration times that is the number of repeating times and the starting position of the iterations for each processor core 14 used on the basis of the number of divided loops.

The parallelism selection code is used in recalculating the number of divided loops by reserving the necessary number of processors for the disturbance interrupting process when the disturbance interrupting process is required for the processor core 14. The iteration number analysis code is also used in recalculating the iteration information on the basis of the recalculated number of divided loops for each processor core 14.

In step S37, a control information transmission code of a driver etc. to be transmitted to the processor core 14 using a communication mechanism provided for another processor core 14 is generated for transmission of control information (iteration information (the number of iteration times, starting position), a process request signal, etc.) to each processor core 14 implemented with a parallel processing code, and the generated code is added to the control core code.

In step S38, the clock of each processor core 14 implemented with a parallel processing code is set, and a power control code for control of hardware such as the power clock control unit 11 relating to the power control of the supply/stop of power of the processor core 14 which does not permit the loop processing is generated, and the generated code is added to the control core code.

In addition, a power control code is used in selecting a processor core used on the basis of the number of divided loops and calculating an operation clock for each selected processor core 14.

The power control code is used in reselecting the processor core 14 used on the basis of the recalculated number of divided loops and recalculating the operation clock for each reselected processor core 14.

In step S39, the processor core 14 implemented with a control core code generates an event handler so that each code generated in steps S36 through S38 may operate in handler processing.

In step S310, a synchronous reception code for reception of a response to the synchronous control information transmitted from the processor core 14 implemented with a parallel processing code is generated and added to the control core code.

In step S311, a reception code for reception of the control information from the processor core 14 implemented with a control core code is generated using a communication mechanism provided in each processor core 14, and added to the parallel processing code. The reception code operates in handler processing (control information reception handler).

In step S312, an interrupt handler is generated.

In step S313, a loop body in the original code of the parallel loop processing code is copied. In this case, the loop body does not include a practical description of iteration, but the number of iteration times and the starting position are set after being propagated from the control core code to the processor core 14 for performing a practical process.

Since the loop body does not include the information about iteration, it is used as a common code regardless of the number of divided loops and the number of iteration times.

In step S314, when the process of the loop body is terminated, a synchronous transmission code for notification of synchronous control information to the control core code is generated and added to the parallel processing code.

In step S315, the parallel processing code in the second intermediate file is converted into an execution code.

In step S316, the codes other than the control core code in the second intermediate file and the parallel loop processing code are converted into execution codes.

In this example, the steps S315 and S316 have functions similar to the execution code generation unit 9 in FIG. 1 and the back end S25 in FIG. 2.

The translation device according to the present embodiment generates two types of codes, that is, the execution code (control core code) corresponding to a control unit and a code (parallel processing code) for parallel execution of the loop body processing.

Figure 4A:
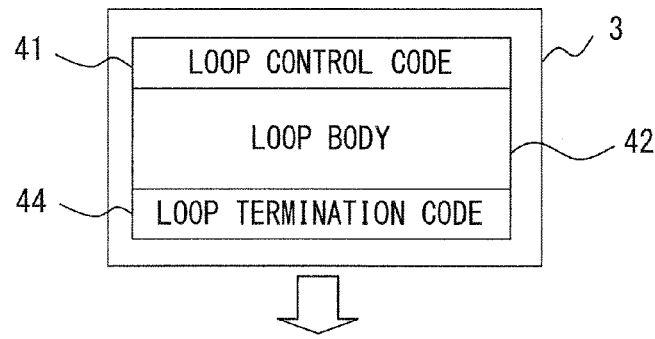
FIGS. 4A and 4B illustrate the structure of the execution code generated according to the embodiment.
Figure 4B:
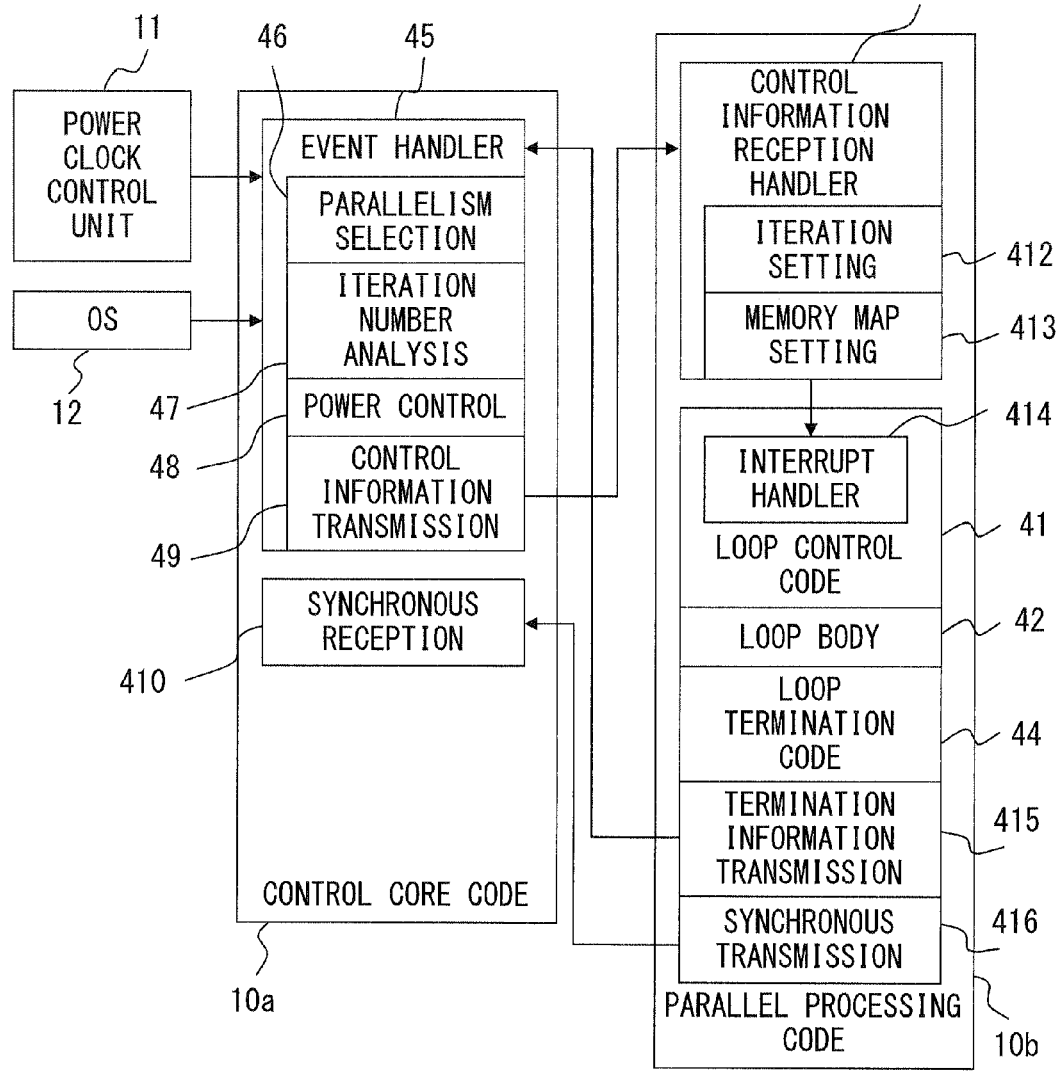

FIG. 4A and FIG. 4B illustrate an image of generating a control core code and a parallel processing code from the source code 3.

The parallel loop processing code described in the source code 3 illustrated in FIG. 1 is configured by a loop control code 41, a loop body 42, and a loop termination code 44 as illustrated in FIG. 4A.

The loop control code 41 includes the description the name etc. of the parallel loop processing, or may be a control code (for example, a FOR statement etc.) for a loop of the arithmetic expression etc.

The loop body 42 is a code describing an arithmetic expression etc. for the looping process as described above.

The loop termination code 44 is a code indicating the end of the parallel loop processing.

FIG. 4B illustrates a control core code and a parallel processing code generated by converting the parallel loop processing (DOALL loop process etc.) of the original code in FIG. 4A.

A control core code 10$a$ is configures by an event handler 45, a control information code (parallelism selection code 46, and iteration number analysis code 47), a power control code 48, a control information transmission code 49, and a synchronous reception code 410.

The event handler 45 handles the disturbance such as the process management of the OS 12, an interrupt from the power clock control unit 11, or handles the termination notification interrupt from each processor core 14 implemented with a parallel processing code 10$b$.

The parallelism selection code 46 (S36), the iteration number analysis code 47 (S36), the power control code 48 (S38), and the synchronous reception code 410 (S310) are described above with reference to the flowchart in FIG. 3. Therefore, the detailed descriptions are omitted here.

The control information transmission code 49 is used in transmitting the iteration information for a processor core selected for the processor core 14. According to the iteration information, the number of looping times (number of iteration times) from the specified iteration (starting position) is set for each processor core 14.

If a state change occurs during the looping process and the current number of iteration times is to be changed or the number of divided loops of the processor core 14 is to be changed, a plurality of numbers of iteration times and starting positions may be set for one processor core 14. In this case, it is necessary that new control information is transmitted.

A state change refers to an event of stopping a processor when the execution of an application is interrupted by the activation of another application or the power clock control unit 11 receives a request from another mechanism of hardware.

When a transmission is made a command relating to the information to be transmitted is added and transmitted.

The parallel processing code 10$b$ is configured by the original codes (41 through 44), a control information reception handler 411, an iteration setting code 412, a memory map setting code 413, an interrupt handler 414, a termination information transmission code 415, and a synchronous transmission code 416.

The control information reception handler 411 is used for communication interruption on the loop control from the control core code. The control information is received to perform the handling.

The iteration setting code 412 is used insetting the number of iteration times and the starting position for each processor core 14.

Since the loop processing is changed by the retransmission of the iteration information, the memory map setting code 413 is used in resetting a necessary memory area according to the iteration information.

The interrupt handler 414 is a code for handling the suspending request interruption from the control information reception handler 411.

The termination information transmission code 415 is used in transmitting memory information in the process of an arithmetic operation (that is, area information used as a local work by the parallel processing code). For example, when the number of iteration times and the starting position are reset by temporarily stopping the loop processing by a disturbance, the processor core 14 implemented with the control core code is notified of the memory information.

The synchronous transmission code 416 notifies the synchronous reception code 410 of the synchronization in the barrier synchronous system etc. The synchronous system is not limited to the barrier synchronous system.

The parallel processing code basically has the mechanism of receiving a request of starting and suspending a loop etc. from a control core.

Figure 5A:
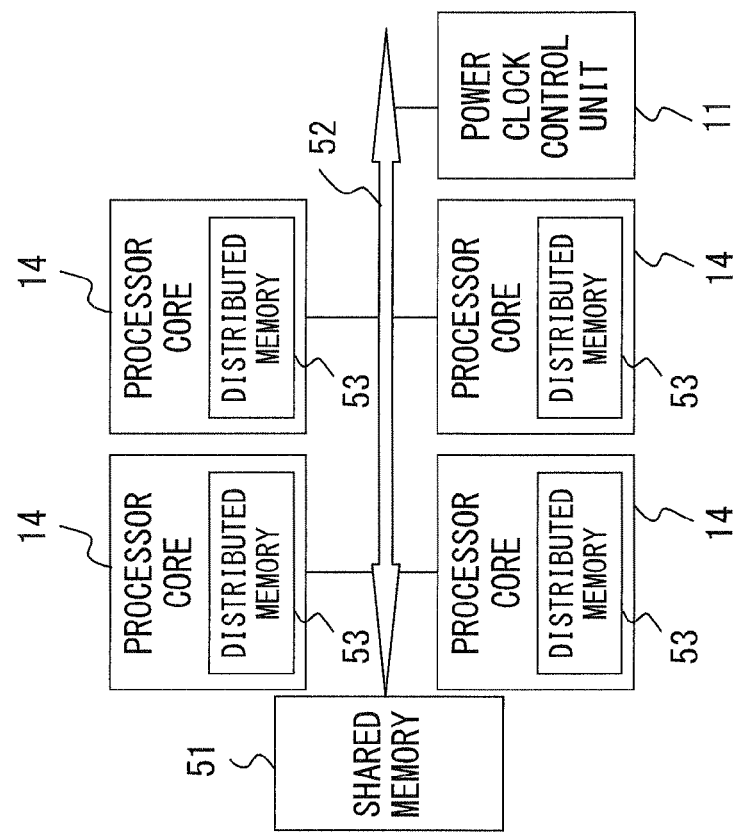
FIGS. 5A and 5B illustrate the basic architecture of the embodiment.
Figure 5B:
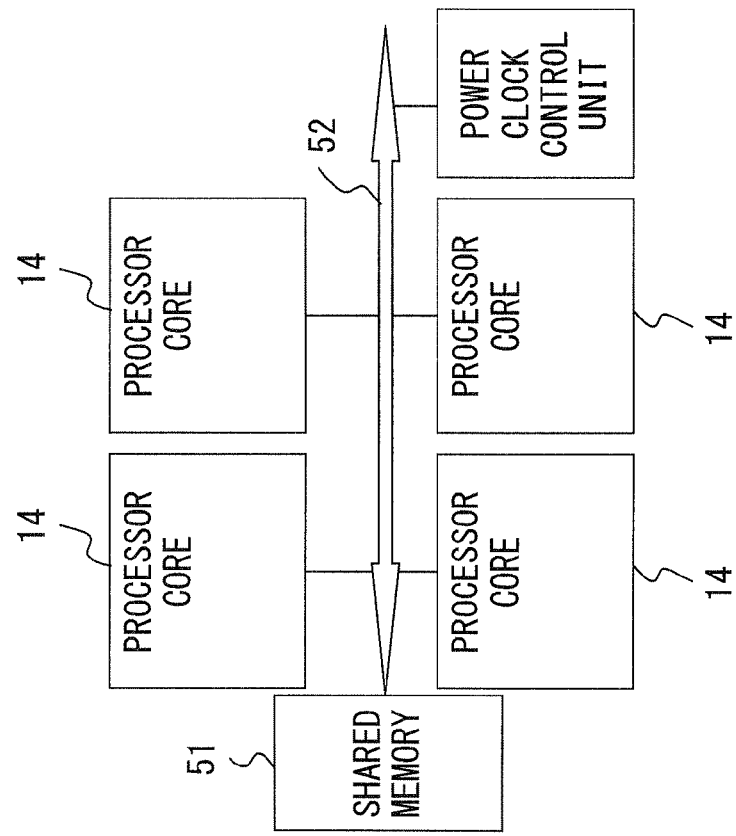

FIG. 5A and FIG. 5B are a configuration of the hardware of the multicore processor for embodiments. FIG. 5A illustrates concentrated shared memory, and each processor core 14 may access shared memory 51 through a bus 52.

FIG. 5B illustrates distributed shared memory, and each processor core 14 may access the shared memory 51 and distributed memory 53 provided for each processor core 14 through the bus 52.

In the present embodiment, the architecture of the concentrated shared memory or the distributed shared memory is assumed, and in the architecture of the distributed shared memory, a shared address space is referenced from each processor by the logical address space uniquely determined in the whole chip with respect to the physical address space in each processor.

In addition, the power control mechanism (power clock control unit 11) for controlling the target processor core 14 is loaded, and the mechanism has the function of a clock, suspension, and activation of each processor core 14 by a hardware effect.

In the present embodiment, it is not necessarily assumed that a processor group configuring a multicore processor is always the same.

(Loop Division)

The characteristic of the power characteristic file illustrated in FIG. 1 and the method of acquiring the optimum solution of the loop division is described below.

Figure 7A:
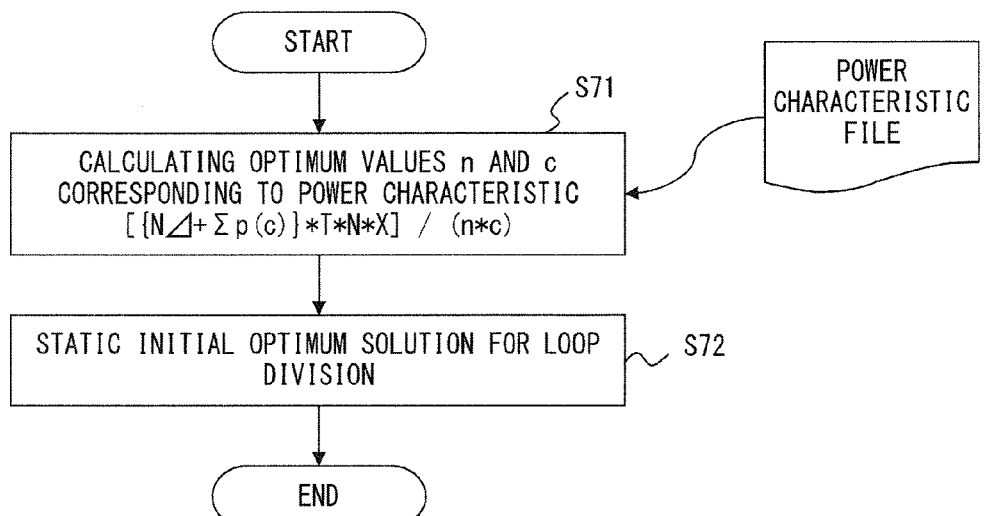
FIGS. 7A and 7B are flowcharts of the dynamic scheduling with the power consumption taken into account.

FIG. 7A is a flowchart of the process of statically calculating the initial value during compilation. The flowchart of FIG. 7A is performed after executing the flow illustrated in FIG. 3.

In step S71, the optimum number of divided loops and the operation clock corresponding to the power characteristic are calculated.

Figure 6:
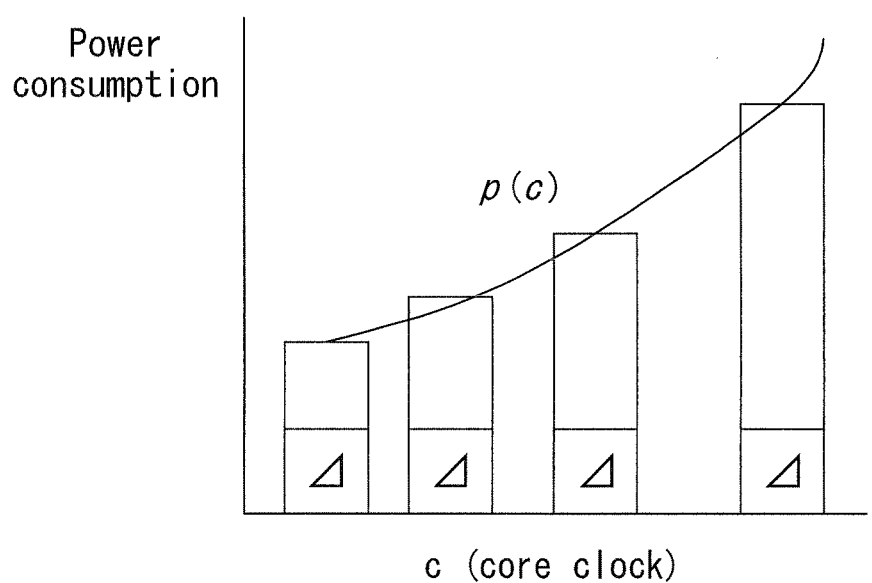
FIG. 6 illustrates the relationship between the operation clock and the power consumption.

Assuming that the power consumption characteristic per processor core 14 at the operation clock frequency x (maximum X) is p (x), the base power for driving the processor core 14 is Δ, and the total number of cores is N, the peak power may be described as expressed by the equation (2). Generally, p (x) is expressed by the graph illustrated in FIG. 6. In the graph illustrated in FIG. 6, the vertical axis indicates the power consumption, and the horizontal axis indicates the frequency of the operation clock.

$$\text{Peak power } Pp = \Sigma\{p(X)+\Delta\} = N\Delta + \Sigma p(X) \quad (2)$$

The equation (2) indicates the case in which the loop parallel process is performed at the maximum parallelism and the highest speed, and the actual total amount of peak power is expressed by a product of the peak power and the execution time T as follows.

$$T*Pp \quad (3)$$

Where the operation clock is c with each loop in parallel for execution of n parallel (number of divided loops=n), and the power consumption is expressed by the equation (3) below. The value of Σ in the following equation is obtained for i=1 through n.

$$\text{Loop parallel processing power consumption} \\ PL = N\Delta + \Sigma p_i(c) \quad (4)$$

where the processing time is n/N for parallelism and c/X for an operation clock, and the processing time is (T*N*X)/(n*c). Therefore, when the parallelism and the clock are changed, the total power consumption may be expressed by the equation (5). However, it is necessary to terminate the process within the process termination time.

$$(PL*T*N*X)/(n*c) \quad (5)$$

By selecting n and c, the minimum value of the equation (5) may be obtained by the following equation.

$$\text{Min}(n,C) = [\{N\Delta + \Sigma p(c)\}*T*N*X]/(n*c) \quad (6)$$

Since the frequency-power characteristic p (x) is different for each processor core 14, the necessary minimum power consumption for the loop processing is obtained by obtaining the n and c as the minimum values of the equation (6) from the equations (3) and (4).

Actually, by the equation (6), the static scheduling is performed and the optimum arrangement is made at the start of the execution on the basis of the values n and c, and when the disturbance occurs during the execution, re-scheduling is performed on the basis of the optimum values of n and c under the disturbance, and the result is applied to a dynamic configuration change using the above-mentioned divided codes.

In the power characteristic file, the characteristic function p (c) different for each processor core 14 as the base of the equation (6) is obtained by an experiment or simulation at the development of a chip. The control core code is referenced using the related information as a table or a function, and is used also during the scheduling.

In step S72, a static initial optimum solution for loop division is set. That is, the number of iteration times and the starting position are set in the parallel processing code on the basis of the number n of divided loops as an initial value.

In addition, the processor core 14 for supply of power is selected for the power clock control unit 11, and the frequency of the operation clock c to be supplied to the selected processor core 14 may be initialized.

(Re-Scheduling)

Described below is the process of re-scheduling when a disturbance occurs in the processor core 14 implemented with the control core code.

Figure 7B:
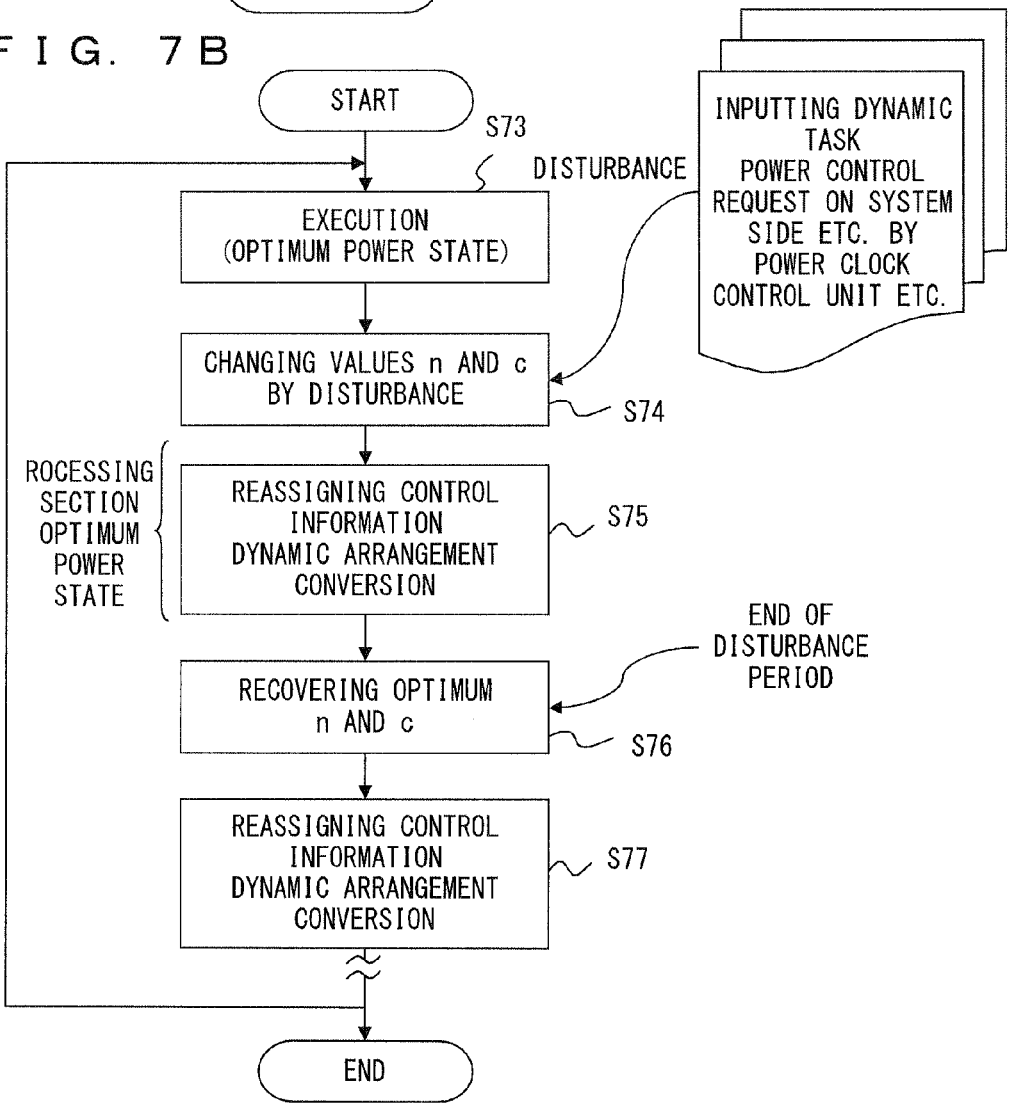

FIG. 7B is a flowchart from the re-scheduling performed when a disturbance occurs to returning to the normal state again. The flow indicates the operation of the multicore processor implemented with the execution code.

In step S73, the parallel loop processing code (DOALL loop) etc. is executed in the optimum power state.

In step S74, the occurrence of a disturbance is detected, and the number of divided loops, the number of iteration times, the starting position, and the frequency of an operation clock are recalculated except the processor core 14 used by the disturbance.

When the input task parallelism is m, the parallelism n' of a new DOALL loop is calculated by the equation (7) (m<n).

$$n' = n - m \quad (7)$$

When the time at which the disturbance has occurred is τ at the relative time from the execution start time, the remaining processing time T' may be expressed by the equation (8), and if the new number of processor cores specified by the power clock control unit 11 is n', the clock c' on the DOALL processing side may be described by the equation (9) on the basis of the equation (6).

$$T' = T - \tau \quad (8)$$

$$\min[\{N\Delta + \Sigma p_i(c)\}*T'*N*X]/(n'*c') \quad (9)$$

As described above, in the control core, the clock indicating the most effective power characteristic indicates the minimum value of c' of the equation (8) when a disturbance occurs (including the loop activation time).

In step S75, a dynamic optimum solution is set for recalculated loop division. That is, the number of iteration times and the starting position are set on the basis of the recalculated number n' of divided loops in the parallel processing code.

For the power clock control unit 11, the processor core 14 for power supply is selected, and the recalculated frequency of the operation clock c' to be supplied to the selected processor core 14 is set.

In step S76, when the disturbance interrupting process relating to the disturbance is terminated, the number of iteration times and the starting position are recovered to the initial values on the basis of the statically set number n of divided loops.

In addition, for the power clock control unit 11, the processor core 14 for the initial setting of the power supply is selected, and the frequency of the operation clock c for supply to the selected processor core 14 is set.

In step S77, when the disturbance occurs again, the optimum value is calculated for a dynamic change by the process similar to step S75.

Operation Example

FIGS. 8A-8D and 8E are models of expressing the effects of the power consumption when the conventional operation is performed and the present embodiment is embodied.

In the model in FIGS. 8A-8D and 8E, in the processor having the basic power value Δ–200 mW as the power characteristic as illustrated in FIG. 8E, a processor having the characteristic of 600, 800, 1600, and 3000 mW of the power consumption of the processor core 14 at 400, 600, 800, and 1000 MHz of the clock is assumed. The power characteristic files 7 and 13 store the above-mentioned contents.

First, when the number of processors of the model processor core 14 is six, and when a DOALL loop, for example, is processed in the conventional technology, and each of six processor cores 14 is allowed to operate at 400 MHz in parallel, 600 mW×6=3600 mW of power is consumed as illustrated in FIG. 8A.

In the conventional model above, when three tasks 81a through 81c are input as the disturbance as illustrated in FIG. 8B, and when each of the input tasks 81a through 81c is expected to have the performance of 400 MHz, the performance before the disturbance may be maintained by driving the clock of the input processor core 14 at 600+400 mHz=1000 MHz.

The power consumption in this case is 600 mW×3+3000 mW×3=10800 mW.

On the other hand, since it is understood that the parallelism 4 and the optimum solution of the frequency of each processor is 600 mHz according to the processing method of the present embodiment by solving the equation (5) for the number of divided loops with the power characteristic of the processor core 14 taken into account, actually two of the six processors can be stopped as illustrated in FIG. 8C. That is, in a static setting, the power consumption may be reduced more effectively than in the conventional method.

In this case, the power consumption is 800 mW×4=3200 mW. That is, as compared with the embodiment in which six parallel operations are effective, four parallel operations with a higher operation clock frequency may acquire an electrically superior result with equivalent performance by including actual power characteristic.

When three tasks of 400 MHz per processing are input in parallel as a disturbance similar to a conventional model, the loop parallelism is changed from 4 to 3 as illustrated in FIG. 8D, and the disturbance tasks 81a through 81c are input to the three available processors. In this case, since the processor core 14 implemented with a parallel processing code enhances the clock up to 800 MHz by the equation (5) to inherit the performance. However, the practical power consumption is 1600 mW×3+600 mW×3=6600 mW. That is, the power consumption may be reduced in the dynamic setting than in the conventional method.

In addition, FIG. 9A and FIG. 9B illustrate the rearrangement of the number of iteration times when the loop division in the model is changed during the process.

The number of iteration times statically set as the initial value in the parallel processing code implemented in the processor core 14 in FIG. 9A is 0 through 249 for the parallel processing code 10b, 250 through 499 for the parallel processing code 10c, 500 through 749 for the parallel processing code 10d, and 750 through 999 for the parallel processing code 10e. The two processor cores 14 are not provided with electric power.

FIG. 9B illustrates the case in which the disturbance interrupt tasks 81a through 81c occur during the operation illustrated in FIG. 9A.

In the present example, a task interrupt occurs on each of the parallel processing codes 10a through 10e when the iterations have been completed from the start of the execution to the 100th iteration.

The task 81a is input to the processor core 14 implemented with each parallel processing code 10e.

When the processor core 14 implemented with each parallel processing code 10e completes the looping process up to the 100th iteration, the 750th through 849 arithmetic operations have been completed.

Then, recalculation and rescheduling processes are performed and the 850th through 999th iterations are divided into three parts, that is 850th through 899, 900 through 949, and 950 through 999 iterations. The 0 through 249th and 850 through 899th iterations are assigned to the parallel processing code 10b, the 250 through 499th and 900 through 949th iterations are assigned to the parallel processing code 10c, and the 500 through 749th and 950 through 999th iterations are assigned to the parallel processing code 10d.

When the processes of the tasks 81a through 81c are completed, the state illustrated in FIG. 9A is recovered.

In this model case, it is confirmed that the operation can be performed with the power consumption of 60% of the conventional power consumption, and effectiveness of the method of the present embodiment may be confirmed. That is, the loop parallel processing may be dynamically determined depending on the practical operation state without specifying the parallelism during compilation.

The control process illustrated in the flowchart of the embodiment above may be realized by directing a computer to execute the program describing an instruction to perform the control process.

The program is stored in a storage medium such as CD-ROM etc. to install the program in the computer and realize the control process. The program may be downloaded into the computer through a communication network.

In addition, when a processor having a plurality of processor cores is used, a control unit may be provided for each processor core for selecting a processor core by calculating the necessary number of processor cores for performing a process within a loop processing time on the basis of the operation clock, the operation power consumption corresponding to the frequency of the operation clock, and the necessary loop process time for the parallel loop processing, and calculating the operation clock for the selected processor core.

With the above-mentioned configuration, the power consumption may be reduced by dynamically changing the number of processors for performing parallel processing and the operation clock of each processor when the parallel processing is performed by a system configured by a plurality of processors and a multicore processor.

According to the above-mentioned configuration, the number of processors for performing parallel processing and the operation clock of each processor are dynamically changed when the parallel processing is performed by a system configured by a plurality of processors and a multicore processor, thereby reducing the power consumption.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment has been described in detail, it should be understood that the various changes, substitutions, and alterations could be made hereto without departing from the spirit and scope of the invention, the scope of which is defined in the claims and their equivalents.

What is claimed is:

1. A computer-implemented compile method for compiling a source code implemented in a plurality of processor cores, the compile method comprising:

detecting from the source code a parallel loop processing code in which an internal processing operation is executed for a given number of repeating times and internal processing operations to be executed for the given number of repeating times are independent of each other and are parallelizable;

generating a control core code for control of the number of repeating times in the parallel loop processing code and a parallel processing code for changing the number of repeating times corresponding to the control from the control core code;

calculating a number of processor cores which perform a process of the parallel processing code and for acquisition of a result as a number of divided loops;

selecting the processor core used on a basis of the number of divided loops, and calculation of an operation clock for each selected processor core;

calculating a number of iteration times as the number of repeating times for each processor core used on a basis of the number of divided loops and a starting position of the iteration, and for definition of a calculation result as iteration information; and recalculating the number of repeating times for each processor core to execute the parallel loop processing code other than processor cores necessary for executing a disturbance interrupting process when the disturbance interrupting process occurs during execution of the parallel loop processing code.

2. The method according to claim 1, wherein calculating the number of processor cores which process the parallel processing code within the loop processing time on a basis of the operation clock, the operation power consumption corresponding to the frequency of the operation clock, and the loop processing time which processes the parallel loop processing code for each processor core for executing the parallel processing code, and defining a calculation result as a number of divided loops.

3. The method according to claim 1, wherein the control core code comprises a control information transmission code for transmission of the iteration information to the processor core for executing the parallel processing code.

4. The method according to claim 1, wherein corresponding to the disturbance interrupting process to the processor, providing a parallelism selection code with a code for reservation of a necessary number of processors for the disturbance interrupting process, and recalculation of the number of divided loops;

providing a power control code with a code for reselection of the processor core used on a basis of the recalculated number of divided loops, and recalculation of the operation clock for each reselected processor core; and providing an iteration number analysis code with a code for recalculation of the iteration information for each processor core on a basis of the recalculated number of divided loops.

5. The compile method according to claim 1, wherein receiving, at a processor core configured to execute the parallel loop processing code, information of the recalculated number of repeating times from a processor core implementing the control core code, and changes the number of repeating times in accordance with the received information of the recalculated number of repeating times.

6. A compiler which is stored in a non transitory computer-readable media, compiles a source code, and is implemented in a plurality of processor cores, the compiler comprising:

a parallel loop processing detection unit configured to detect from the source code a parallel loop processing code in which an internal processing operation is executed for a given number of repeating times and internal processing operations to be executed for the given number of repeating times are independent of each other and are parallelizable; and a dynamic parallel conversion unit configured to generate a control core code for control of the number of repeating times in the parallel loop processing code and a parallel processing code for changing the number of repeating times corresponding to the control from the control core code, wherein the control core code generated by the dynamic parallel conversion unit is configured by:

a parallelism selection code for calculation of a number of processor cores which perform a process of the parallel processing code and for acquisition of a result as a number of divided loops;

a power control code for selection of the processor core used on a basis of the number of divided loops, and calculation of an operation clock for each selected processor core; and an iteration number analysis code for calculation of a number of iteration times as the number of repeating times for each processor core used on a basis of the number of divided loops and a starting position of the iteration, and for definition of a calculation result as iteration information, and wherein when a disturbance interrupting process occurs during execution of the parallel loop processing code, the number of repeating times is recalculated for each processor core to execute the parallel loop processing code other than processor cores necessary for executing the disturbance interrupting process.

7. The compiler according to claim 6, wherein the parallelism selection code is used in calculating the number of processor cores which process the parallel processing code within the loop processing time on a basis of the operation clock, the operation power consumption corresponding to the frequency of the operation clock, and the loop processing time which processes the parallel loop processing code for each processor core for executing the parallel processing code, and defining a calculation result as a number of divided loops.

8. The compiler according to claim 7, wherein the control core code generated by the dynamic parallel conversion unit comprises a termination information reception code for reception of a termination information interrupt signal for notification of a process state of the processor core which executes the parallel processing code.

9. The compiler according to claim 8, wherein the parallel processing code generated by the dynamic parallel conversion unit comprises a termination information transmission code for transmission of a termination information interrupt signal for notification of a process state of the processor core which executes the parallel processing code.

10. The compiler according to claim 7, wherein the parallel processing code generated by the dynamic parallel conversion unit comprises an iteration setting code for settings of the number of iteration times and the starting position according to the iteration information when the iteration information is acquired and a memory map setting code for a setting of a memory map.

11. The compiler according to claim 6, wherein the control core code comprises a control information transmission code for transmission of the iteration information to the processor core for executing the parallel processing code.

12. The compiler according to claim 11, wherein the control core code generated by the dynamic parallel conversion unit comprises a barrier synchronous code for reception of a barrier synchronous signal for barrier synchronous control which is transmitted from the processor core for execution of the parallel processing code.

13. The compiler according to claim 12, wherein
the parallel processing code generated by the dynamic parallel conversion unit comprises a barrier synchronous code for transmission of a barrier synchronous signal for barrier synchronous control from the processor core for execution of the parallel processing code.

14. The compiler according to claim 6, wherein corresponding to the disturbance interrupting process to the processor,
the parallelism selection code is provided with a code for reservation of a necessary number of processors for the disturbance interrupting process, and recalculation of the number of divided loops;
the power control code is provided with a code for reselection of the processor core used on a basis of the recalculated number of divided loops, and recalculation of the operation clock for each reselected processor core;
and the iteration number analysis code is provided with a code for recalculation of the iteration information for each processor core on a basis of the recalculated number of divided loops.

15. The compiler according to claim 14, wherein the disturbance interrupting process is controlled according to an interrupt signal from an operating system provided for the multicore processor.

16. The compiler according to claim 6, wherein the power control code is used for control of a power and clock control unit provided for the multicore processor for controlling the supply and stop of power or a clock to the processor core so that the supply and stop of the power and the clock are controlled.

17. The compiler according to claim 6, wherein
a processor core configured to execute the parallel loop processing code receives information of the recalculated number of repeating times from a processor core implementing the control core code, and changes the number of repeating times in accordance with the received information of the recalculated number of repeating times.

18. A non-transitory computer-readable storage medium storing a program used to direct a computer to execute a process for compiling a source code implemented in a plurality of processor cores, the process comprising:
detecting from the source code a parallel loop processing code in which an internal processing operation is executed for a given number of repeating times and internal processing operations to be executed for the given number of repeating times are independent of each other and are parallelizable;
generating a control core code for control of the number of repeating times in the parallel loop processing code and a parallel processing code for changing the number of repeating times corresponding to the control from the control core code;
calculating a number of processor cores which perform a process of the parallel processing code and for acquisition of a result as a number of divided loops;
selecting the processor core used on a basis of the number of divided loops, and calculation of an operation clock for each selected processor core;
calculating a number of iteration times as the number of repeating times for each processor core used on a basis of the number of divided loops and a starting position of the iteration, and for definition of a calculation result as iteration information, and
recalculating the number of repeating times for each processor core to execute the parallel loop processing code other than processor cores necessary for executing a disturbance interrupting process when the disturbance interrupting process occurs during execution of the parallel loop processing code.

19. The non-transitory computer-readable storage medium according to claim 18, wherein
receiving, at a processor core configured to execute the parallel loop processing code, information of the recalculated number of repeating times from a processor core implementing the control core code, and changes the number of repeating times in accordance with the received information of the recalculated number of repeating times.

20. A computer-implemented method for controlling a plurality of processor cores implemented with a source code compiled by a compiler, the method comprising
a parallel process of performing:
a parallel loop process in which an internal processing operation is executed for a given number of repeating times and internal processing operations to be executed for the given number of repeating times are independent of each other and are parallelizable,
calculating the number of processor cores which process the parallel processing code within the loop processing time on a basis of an operation clock, the operation power consumption corresponding to the frequency of the operation clock, and the loop processing time required to process the parallel loop processing code for each processor core for executing the parallel processing code, and defining a calculation result as a number of divided loops;
selecting the processor core to be used on the basis of the number of divided loops, and calculating the operation clock for each of the selected processor cores;
calculating a number of iteration times as the number of repeating times for each processor core used on a basis of the number of divided loops and a starting position of the iteration, and defining a calculation result as iteration information;
control of dynamically changing a number of repeating times of the parallel loop processing performed by dividing the plurality of processor cores according to the received iteration information, and
recalculating the number of repeating times for each processor core to execute the parallel loop processing code other than processor cores necessary for executing a disturbance interrupting process when the disturbance interrupting process occurs during execution of the parallel loop processing code.

21. The method according to claim 20, wherein
receiving, at a processor core configured to execute the parallel loop processing code, information of the recalculated number of repeating times from a processor core implementing the control core code, and changes the number of repeating times in accordance with the received information of the recalculated number of repeating times.

22. A processor, comprising:
a plurality of processor cores; and
a control unit for each processor core for:

calculating a number of processor cores which perform a process of a parallel processing code and for acquisition of a result as a number of divided loops;

selecting the processor core used on a basis of the number of divided loops, and calculation of an operation clock for each selected processor core;

calculating a number of iteration times as a number of repeating times for each processor core used on a basis of the number of divided loops and a starting position of the iteration, and for definition of a calculation result as iteration information; and calculating a necessary number of processor cores for performing processing within a loop processing, selecting the processor core on a basis of an operation clock, operation power consumption corresponding to a frequency of the operation clock, and a necessary loop processing time for parallel loop processing, and calculating the operation clock for each selected processor core, wherein when a disturbance interrupting process occurs during the parallel loop processing, a number of repeating times of an internal processing operation executed in a parallel loop processing code is calculated for each processor core to execute the parallel loop processing code other than processor cores necessary for executing the disturbance interrupting process.

23. The processor according to claim 22, wherein a processor core configured to execute the parallel loop processing code receives information of the recalculated number of repeating times from a processor core implementing the control core code, and changes the number of repeating times in accordance with the received information of the recalculated number of repeating times.

* * * * *